United States Patent [19]
Knapp et al.

[11] 3,907,323
[45] Sept. 23, 1975

[54] GAME CART

[76] Inventors: Larry L. Knapp, Box 26, c/o John Bojanski, Louisville, Nebr. 68037; Leonard A. Knapp, 116 Cherry O.V., Cheyenne, Wyo. 82001

[22] Filed: Apr. 9, 1973

[21] Appl. No.: 349,265

[52] U.S. Cl. ............................................ 280/47.3
[51] Int. Cl. ............................................ B62b 1/14
[58] Field of Search............ 280/47.3, 47.24, 47.26, 280/47.23; 296/20; 224/7 R

[56] References Cited
UNITED STATES PATENTS
2,992,834  7/1961  Tidwell et al. ..................... 280/47.3
3,236,537  2/1966  Eckman ............................. 280/47.3

FOREIGN PATENTS OR APPLICATIONS
376,810  6/1907  France ............................ 280/47.24
80,219  3/1894  Germany ............................. 296/20

*Primary Examiner*—David Schonberg
*Assistant Examiner*—John A. Pekar
*Attorney, Agent, or Firm*—Hiram A. Sturges

[57] ABSTRACT

A game cart having a wheel supported frame, the frame being shaped generally for cradling an animal between its sides and further having a special depression of greater depth for receiving the buttocks of an animal, the cart having a brake system and having a pair of handles at its rearward end and a pair of stabilizing poles at its forward end for a two-man operation, the forward ends of the poles being of adjustable height.

10 Claims, 4 Drawing Figures

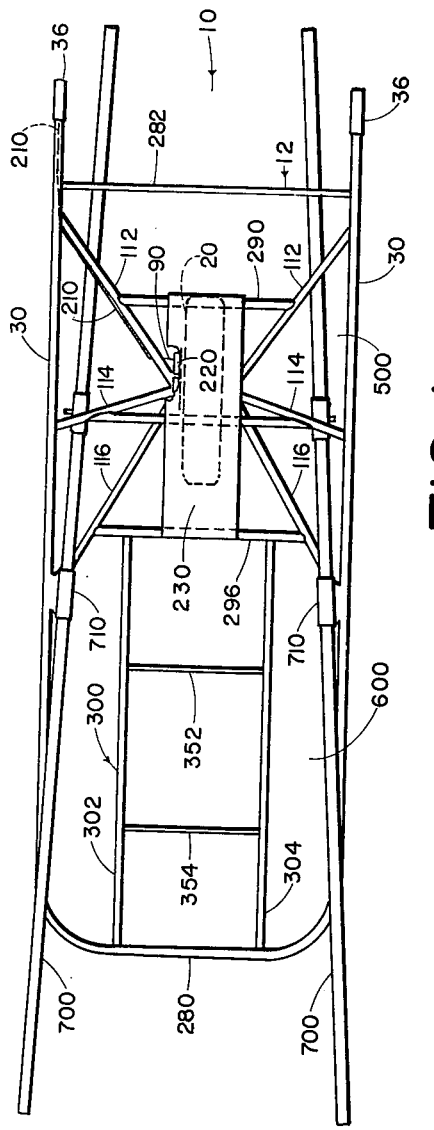
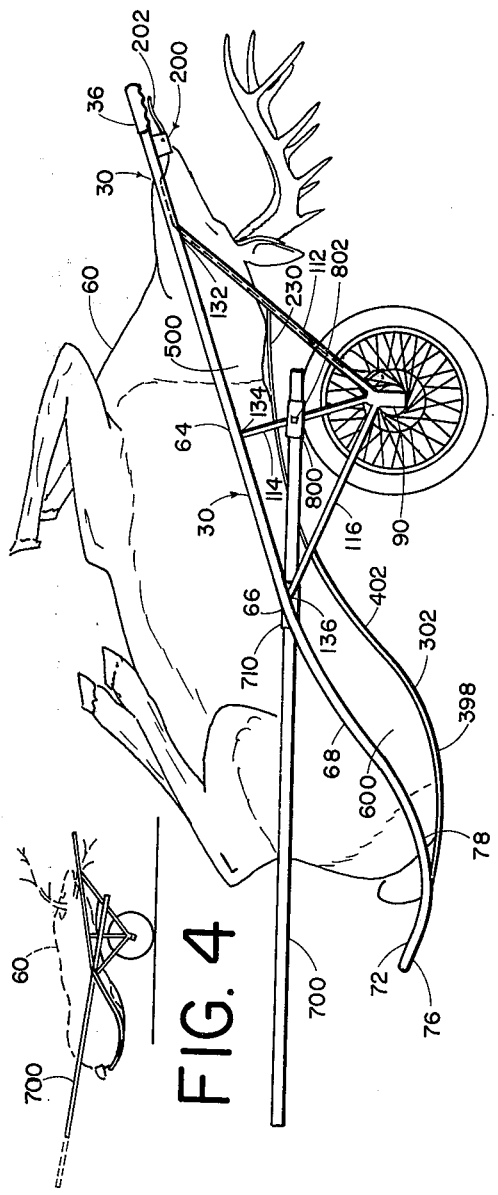
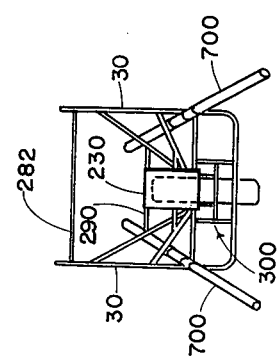

GAME CART

FIELD OF THE INVENTION

This invention is in the field of wheeled devices by the use of hunters in bringing heavy game back out of rough country from a kill area to a vehicle area.

DESCRIPTION OF THE PRIOR ART

Game carts can be used to carry elk, deer, moose, bear, antelope, wild boar, mountain sheep, mountain goat, to name some of the animals commonly hunted in North America.

Game carts of the prior art have had one wheel and have had two hand grips at their rear, in some cases, and two handles sticking forwardly, in some cases, but the handles sticking forwardly have always been welded to the frame and have not been adjustable.

Since operators are of different heights, a handle that is not adjustable in height can be awkward for some users.

Game carts of the prior art have not always had the feature of collapsibility for reduction in their length. The amount of length reduction actually needed is not great because a game cart is usually carried on the top of a vehicle. But a certain amount of collapsibility is desirable. In going down steep inclines it is difficult to restrain a cart containing a large animal, such as a deer or bear, from coming out of control and rolling on down hill.

Some game carts have been excessively heavy and lightness is a virtue to be sought.

SUMMARY OF THE INVENTION

A game cart having a pair of rear grip portions, wheel means under its frame, a first carcass recess means above its wheel means in the frame, the frame having a second carcass receiving means in its upper side and disposed forwardly of the wheel means, the frame having a first carcass receiving recess bottom-forming means disposed above said wheel means, the frame having a second carcass bottom-forming means disposed a substantial distance forwardly of the wheel means for receiving therein the buttocks of an animal when the animal is carried with its legs upward and its tail forward, the depth of the second carcass recess being greater than the depth of the first carcass recess so as to carry the buttock portion of the carcass as low as possible for a low center of gravity for the combined cart and carcass for the purpose of gaining stability.

The wheel means preferably being a single wheel for presenting the least resistance to obstacles on the ground. The first carcass recess bottom-forming means being of a size and position to serve as a fender. The second carcass recess bottom-forming means being non-continuous and relatively open, except for its frame work to provide a lightness.

The cart having a hand brake cooperative with the wheel controllable from adjacent a rear hand grip portion.

The cart having a pair of forwardly extending poles adapted to be gripped by a second operator at the front of the cart. The poles extending at an angle of about 20° forwardly and upwardly with respect to uppermost forward-to-rearwardly extending side members at the top of the frame, whereby the forward ends of the poles are at a convenient height for gripping by the second operator. The poles are adjustably attached to the frame so that they can be positioned for the forward ends to be at an adjustable for use by different operators, and whereby the poles can be stored in a more rearward position to reduce the overall length of the cart for storage.

The frame comprises two basic side frame portions which extend forwardly and rearwardly and which are spaced a substantial distance above the first recess bottom-forming means in the area disposed above the wheel as seen in side elevation to provide the cart with a shape for preventing a carcass from rolling over the sides thereof.

The frame having axle bearings on the ends of the axle and having wheel support frame members attached thereto respectively and respectively attached to right and left basic side frame portions.

The forward recess being formed by having side frame portions disposed above the forward recess bottom-forming means.

BRIEF DESCRIPTION OF THE DRAWINGS

FIG. 1 is a top plan view of the game cart of this invention, shown with a portion of a first recess bottom-forming means and which also serves as a fender being broken away to show brake means thereunder cooperative with the wheel, which latter is shown in dotted lines.

FIG. 2 is a side elevation of the game cart showing a buck deer thereon, the cart being shown in a position it would assume if the cart were moving down hill to the left.

FIG. 3 is a frontal elevation of the cart as would be seen from the left side in FIG. 2.

FIG. 4 is a smaller view showing the forwardly extending poles in a position adjusted somewhat more rearwardly than FIG. 2, a buck deer being shown thereon in another position, although not the preferred position.

DESCRIPTION OF THE PREFERRED EMBODIMENT

The game cart of this invention is generally indicated at 10 in FIG. 1 and has a frame generally indicated at 12, on the underside of which is a wheel 20.

The frame 12 has two basic side frame portions which extend forwardly and rearwardly as seen at 30, and which are spaced apart a substantial distance so that the rearward end thereof can be gripped by an operator as shown at the grips 36, the spacing of the basic side frame portions 30 being sufficient for defining therebetween a substantial space to receive an animal such as a buck deer shown at 60 in FIGS. 2 or 3.

The spacing of the grips 36 is also sufficient that a man can stand between the grips 36.

The basic side frame portions 30 extend forwardly and rearwardly and are parallel to one another as seen in side elevation and each are elongated and form the uppermost parts of the frame 12. Each basic side frame portion 30 has a main part 64, which is straight and which occupies over half of the length of the respective side frame portion from the rearward end thereof to a point substantially forward of the wheel 20, such point being indicated at 66. From the point 66 forward each side frame portion 30 extends at an incline downwardly and forwardly having a convex upper surface 68 meeting a forwardmost portion 72 which is concave, the forward tip 76 thereof extended upwardly from a lowermost point 78 thereof.

The frame 12 has right and left axle bearing means 90 thereon which receive the right and left ends of an axle, not shown, attached to the wheel 20.

The wheel 20 is disposed to roll in a forward to rearward plane whereby its axle extends from right to left, and the right and left wheel bearings 90 each have three wheel support frame members 112, 114 and 116 extending upwardly therefrom and out away from the wheel 20 at an inclination, so that although the bearings 90 are near the center of the cart from right to left, yet the wheel support frame members are all straight and are connected to the undersides respectively of the right and left basic side frame portions 30 at three points 132, 134 and 136, respectively, for rear support side frame member 112, center support side frame member 114 and forward support side frame member 116, respectively.

A hand brake assembly, generally indicated at 200, is provided, having a hand grip section thereof 202 mounted adjacent one of the rear grip portions 36 of the side frame members 30 with a portion of the hand brake assembly 200 extending forwardly, as seen at 210, at dotted lines in FIG. 1, downwardly to a forwardmost section of the hand brake assembly, which latter is seen at 220 at FIG. 1 for a portion of a fender, or first carcass recess bottom-forming means 230 which has been partially broken away in FIG. 1 to show the forward portion of the hand brake assembly 220.

Since said hand brake assemblies are common, it is believed unnecessary to show the details, although it is to be understood that it effectively brakes the wheel 20 whenever it is operated at its lever 202 which moves upwardly and downwardly.

The forward ends of the basic side frame members 30 are interconnected by a forward transverse frame member 280 and the rearward ends of the basic side frame members 30 are interconnected by rearward transverse frame member 282. The two rearward wheel support frame members 112 are interconnected by a horizontally extending transverse frame member 290 disposed approximately mid-way upwardly along the lengths of the rearward support frame members 112, which latter serves the purpose of supporting the rearward end of the first carcass recess bottom-forming means 230 to which it is attached, the forward end of the first recess bottom-forming means or fender 230 being disposed above and attached to a forward fender support horizontal transverse frame member 296, which latter extends between the right and left wheel support forward frame members 116 approximately one-third of the way down from the upper ends thereof.

A second carcass recess bottom-forming means is generally shown at 300, and is formed of right and left bottom-forming forward-to-rearwardly extending members 302 and 304, each connected at the forward ends to the frame member 280, and at their rearward ends to the frame member 296 and interconnected by horizontally extending transverse bottom-forming means members 352 and 354, which latter are spaced apart forwardly and rearwardly of each other so as to support a carcass thereon. The second carcass recess bottom-forming means side frame members 302 are convex on their underside as seen at 398 along their forward halves and concave on their underside as seen at 402 along their rearward halves and are formed of tubular material and are disposed spaced a substantial distance downwardly from the basic side frame members 30 a substantial distance as seen in side elevation throughout the most of their lengths, so that a carcass rested thereon can be received between the side frame members 30 and supported.

A first carcass recess means is generally shown at 500 bounded on its underside by the fender 230 and on its upper side edges by the basic side frame portions 30 and bounded on its sides by the upwardly and outwardly extending wheel support frame members 112, 114 and 116 on the right and left sides thereof.

A second carcass receiving recess means is shown at 600 and is disposed forwardly of the wheel 20 and disposed forwardly of the first carcass recess means 500 and is bounded by the second carcass receiving recess bottom-forming means 300 at its bottom, and by the basic side frame members 30 at its sides and top. The first and second carcass recess means 500 and 600 join each other continuously, since their undersides are on the same level at the point where they join.

A pair of forwardly extending poles 700 extend forwardly of the remainder of the cart where they can be gripped by an operator standing therebetween for steadying the cart and guiding it.

The poles 700 are straight and extend rearwardly and downwardly through sleeves 710 attached to the side frame members 30, respectively, and which snugly receive the respective poles 700 permitting them to move forwardly and rearwardly. The poles also extend through anchor assemblies 800 at the rearward end which latter are pieces of pipe welded to the outer sides of the center wheel support frame members 114, respectively, and having set screws 802 therethrough, which make it possible to fix the position of the poles, each with respect to the frame 12, and to release them and adjust them as desired. For example, in FIG. 4, the poles are extended farther rearwardly and they can be extended still farther rearwardly for storage when desired.

In operation the cart will be found to be light and strong, of minimum number of parts and particularly adapted for use by two operators who can steady the cart, lift it, and steer it over all kinds of obstacles with greater ease.

I claim:

1. A game cart having a frame, ground-engaging wheel means rotatably attached to and supporting said frame, said wheel means defining all ground-engaging wheel means on said cart and rotating about a single axis line, said wheel means being disposed substantially at the center from right to left of said cart, said frame having rear grip portions at its rearward end adapted to be gripped by the hands of an operator, said frame having a first carcass recess means in its upper side disposed above its wheel means, said frame having a second carcass receiving recess means in its upper side and disposed forwardly of said wheel means, said frame having a first carcass recess bottom-forming means disposed above said wheel means, said frame having a second carcass recess bottom-forming means disposed a substantial distance forwardly of all wheel means on said cart and adapted to receive therein the buttocks of an animal when the animal is carried with its legs upward and its tail forward, the depth of said second carcass recess bottom-forming means being greater than the depth of said first carcass recess bottom-forming means so as to carry the buttocks portion of the carcass as low as possible for a low center of gravity for the combined cart and carcass to provide stability.

2. The cart of claim 1 in which said wheel means is a single wheel and in which said first carcass recess bottom-forming means is of a size and position and sufficiently continuous as to serve as a fender for said wheel.

3. The game cart of claim 2 in which said second recess bottom-forming means is rigid and is also non-continuous for lightness.

4. The game cart of claim 1 in which said cart has a hand brake cooperative with said wheel means and having a control adjacent one of said rear grip portions.

5. The game cart of claim 1 further having a pair of forwardly extending poles each having a forward grip portion at its forward end, and pole-attaching means for attaching rearward portions of said poles to said frame.

6. The game cart of claim 5 in which said pole-attaching means comprises pole-receiving means attached to its frame and slidably and adjustably receiving said poles whereby said poles are each adjustably attached to said frame in a manner such that said poles can extend at an incline upwardly and forwardly various distances from said frame so that said grip portions can be adjusted in height by selectively adjusting said poles with respect to said frame.

7. The combination of claim 1 in which said frame comprises two basic side frame portions which extend forwardly and rearwardly and which are spaced a substantial distance above said first recess bottom-forming means in the area disposed above said wheel means as seen in side elevation, means interconnecting said forward and rearward portions of said basic side frame portions.

8. The combination of claim 7 comprising axle bearing means disposed on the right and left ends of said axle, wheel supporting frame members extending upwardly from the right wheel support bearing and connected at their other upper ends to the right one of said basic side frame portions, wheel support frame members extending upwardly from the left wheel support bearing and connected at their other upper ends to the left one of said basic side frame portions.

9. The game cart of claim 7 in which said forward recess bottom means is disposed beneath said basic side frame portions.

10. A game cart having a frame, ground-engaging wheel means rotatably attached to and supporting said frame, said frame having rear grip portions at its rearward end adapted to be gripped by the hands of an operator, said frame having a carcass recess means in the upper side, a pair of forwardly extending poles each having a forward grip portion at its forward end, and pole attaching means for attaching rearward portions of said poles to said frame, in which said pole-attaching means comprises pole-receiving means attached to its frame and slidably and adjustably receiving said poles whereby said poles are each adjustably attached to said frame, said pole-receiving means inclined upwardly and forwardly relative to said supporting frame so that said poles can extend at an incline upwardly and forwardly various distances from said frame so that said grip portions can be adjusted in height by selectively adjusting said poles with respect to said frame.

* * * * *